United States Patent
Clavel et al.

(10) Patent No.: US 12,167,225 B2
(45) Date of Patent: Dec. 10, 2024

(54) DISTRIBUTED PROCESSING OF SOUNDS IN VIRTUAL ENVIRONMENTS

(71) Applicant: Roblox Corporation, San Mateo, CA (US)

(72) Inventors: Philippe Clavel, Belmont, CA (US); Paul Kerr, San Mateo, CA (US); David O'Neal, San Mateo, CA (US); Frederick William Umminger, III, Oakland, CA (US); Alex Zhukov, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 119 days.

(21) Appl. No.: 17/979,416

(22) Filed: Nov. 2, 2022

(65) Prior Publication Data
US 2024/0147178 A1    May 2, 2024

(51) Int. Cl.
H04S 7/00    (2006.01)
G06T 7/70    (2017.01)
H04S 3/00    (2006.01)

(52) U.S. Cl.
CPC ............... *H04S 7/303* (2013.01); *G06T 7/70* (2017.01); *H04S 3/008* (2013.01);
(Continued)

(58) Field of Classification Search
CPC .. H04S 2400/11; H04S 2400/15; H04S 7/303; H04S 2400/01; H04S 3/008;
(Continued)

(56) References Cited

U.S. PATENT DOCUMENTS

| 2017/0353811 A1* | 12/2017 | McGibney .............. H04S 7/303 |
| 2018/0043262 A1 | 2/2018 | Gohara |
| 2023/0239645 A1 | 7/2023 | Hotta |

FOREIGN PATENT DOCUMENTS

| WO | 2014/146015 | 9/2014 |
| WO | 2022/004665 | 1/2022 |

OTHER PUBLICATIONS

Ying Peng Que : "Minimising the computational cost of providing a mobile immersive communication environment (MICE)", 2006. CCNC 2006. 20 06 3rd IEEE Las Vegas, NV, USA Jan. 8-10, 2006, Piscataway, NJ, USA, IEEE, vol. 2, Jan. 8, 2006, pp. 1163-1167 (Year: 2006).*

(Continued)

*Primary Examiner* — Norman Yu
(74) *Attorney, Agent, or Firm* — IP Spring

(57) ABSTRACT

Some implementations relate to methods, systems, and computer-readable media for providing audio for virtual experiences. In some implementations, a method includes receiving, at a server, a first request to generate a plurality of sounds for a user device, wherein the user device is associated with a virtual experience hosted by the server, obtaining, by the server, sound source data for a plurality of sound sources associated with the plurality of sounds, obtaining, by the server, virtual experience state information that comprises a location of a virtual microphone in the virtual experience and at least one of a velocity of the virtual microphone in the virtual experience or an orientation of the virtual microphone in the virtual experience, generating, by the server, an audio mix of the plurality of sounds based on the sound source data and the virtual experience state information, and transmitting the audio mix to the user device.

24 Claims, 7 Drawing Sheets

(52) U.S. Cl.
CPC . *G06T 2207/30244* (2013.01); *H04S 2400/01* (2013.01); *H04S 2400/11* (2013.01); *H04S 2400/13* (2013.01); *H04S 2400/15* (2013.01)

(58) Field of Classification Search
CPC .... H04S 2420/01; H04S 2420/11; H04S 7/40; H04S 7/302; H04R 2430/20; H04R 29/005; G06T 7/70; G06T 2207/30244; G06T 19/003; G06T 13/80; G06T 15/00
USPC ................................ 381/92, 56, 303, 310, 58
See application file for complete search history.

(56) References Cited

OTHER PUBLICATIONS

Boustead, et al., "DICE: internet delivery of immersive voice communication for crowded virtual spaces", IEEE Proceedings, VR 2005, Virtual Reality, 2005, 9 pages.

EPO, International Search Report for International Patent Application No. PCT/US2023/036047, Mar. 1, 2024, 4 pages.

EPO, Written Opinion for International Patent Application No. PCT/US2023/036047, Mar. 1, 2024, 6 pages.

Que, et al., "Minimising the computational cost of providing a mobile immersive communication environment (MICE)", Consumer Communications and Networking Conference, 2006, 7 pages.

Wwise, the most advanced, feature-rich interactive audio solution, https://www.audiokinetic.com/en/products/wwise/, (Accessed on Jan. 10, 2023), 14 pages.

WebRTC, https://webrtc.org/, (Accessed on Jan. 10, 2023), 2 pages.

FMOD, https://www.fmod.com/, (Accessed on Jan. 10, 2023), 3 pages.

Dolby Atmos, https://www.dolby.com/technologies/dolby-atmos/, (Accessed on Jan. 10, 2023), 8 pages.

Opus Interactive Audio Codec, https://opus-codec.org/, 2011-2017, 3 pages.

Discord Blog, https://discord.com/blog, 2022, 10 pages.

Cuevas-Rodríguez, et al., "3D Tune-In Toolkit: An open-source library for real-time binaural spatialisation", PloS one 14.3, e0211899, 2019, 24 pages.

\* cited by examiner

DISTRIBUTED PROCESSING OF SOUNDS IN VIRTUAL ENVIRONMENTS

TECHNICAL FIELD

Embodiments relate generally to computer-based virtual experiences, and more particularly, to methods, systems, and computer readable media for providing audio for virtual environments.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters and avatars, design, simulate, or create sounds that are utilized within the environments, decorate avatars, exchange virtual items/objects with other users, communicate with other users using audio or text messaging, and so forth.

Some implementations were conceived in light of the above.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that also includes receiving, at a server, a first request to generate a plurality of sounds for a user device, where the user device is associated with a virtual experience hosted by the server; obtaining, by the server, sound source data for a plurality of sound sources in the virtual experience, each sound source associated with a particular sound of the plurality of sounds; obtaining, by the server, virtual experience state information that may include a location of a virtual microphone in the virtual experience and at least one of: a velocity of the virtual microphone in the virtual experience or an orientation of the virtual microphone in the virtual experience; generating, by the server, an audio mix of the plurality of sounds based on the sound source data and the virtual experience state information; and transmitting the audio mix to the user device. Other embodiments of this aspect include corresponding computer systems, apparatus, and computer programs recorded on one or more computer storage devices, each configured to perform the actions of the methods.

Implementations may include one or more of the following features. The computer-implemented method where transmitting the audio mix to the user device may include providing an encoded audio mix in a streaming audio format. The first request further includes a prioritization value of at least one sound source of the plurality of sound sources. The prioritization value is based on one or more of a loudness of the at least one sound source and a distance of the at least one sound source from the virtual microphone in the virtual experience. Obtaining the virtual experience state information further includes obtaining a head orientation of a user associated with the user device. Generating the audio mix of the plurality of sounds may include: for each sound source of the plurality of sound sources: generating an audio segment for the sound source based on the corresponding sound source data; and applying, to the audio segment, at least one of: a loudness adjustment based on a distance of the sound source from the virtual microphone in the virtual experience, or a doppler adjustment based on the velocity of the virtual microphone in the virtual experience; and after the applying, combining the audio segments of the plurality of sounds to generate the audio mix. Generating the audio mix of the plurality of sounds may include: for each sound source: applying, to the generated audio segment, at least one of: a second loudness adjustment based on a distance of the sound source from the second virtual microphone in the virtual experience; and a second doppler adjustment based on the velocity of the second virtual microphone in the virtual experience; and after the applying of the at least one of the second loudness adjustment and the second doppler adjustment, combining the audio segments of the plurality of sounds to generate a second audio mix. The plurality of sound sources includes at least one diegetic sound source and at least one non-diegetic sound source. Generating the audio mix of the plurality of sounds may include: generating a first set of the plurality of sounds at the server; and transmitting a request to a second server to generate a second set of the plurality of sounds, where the first set and the second set are mutually exclusive. Generating the first set of sounds may include generating one or more sounds of sound sources that are associated with a prioritization value that meet a predetermined prioritization value threshold. The computer-implemented method may include: receiving the request at the second server to generate the second set of the plurality of sounds; generating a portion of the second set of the plurality of sounds at the second server; and transmitting a request to a third server to generate a third set of the plurality of sounds. Obtaining the location of the virtual microphone may include: obtaining a location of a virtual camera placed within the virtual experience; and determining the location of the virtual camera based on the location of the virtual camera. The location of the virtual microphone may include: obtaining a location of an avatar within the virtual experience; and determining the location of the virtual microphone based on the location of the avatar. Obtaining the location of the virtual microphone may include: obtaining a location of a virtual camera placed within the virtual experience; obtaining a location of an avatar within the virtual experience; and determining the location of the virtual microphone based on the location of the virtual camera. The location of the virtual microphone is determined such that the virtual microphone is equidistant from the location of a virtual camera and the location of the avatar. Implementations of the described techniques may include hardware, a method or process, or computer software on a computer-accessible medium.

The non-transitory computer-readable medium also includes receiving, at a server, a first request to generate a plurality of sounds for a user device, where the user device is associated with an avatar that participates in a virtual experience hosted by the server; obtaining, by the server, sound source data for a plurality of sound sources associated with the plurality of sounds; obtaining, by the server, virtual experience state information that may include a location of a virtual microphone in the virtual experience and at least one of: a velocity of the virtual microphone in the virtual experience or an orientation of the virtual microphone in the virtual experience; generating, by the server, an audio mix of the plurality of sounds based on the sound source data and the virtual experience state information; and transmitting the audio mix to the user device. Other embodiments of this aspect include corresponding computer systems, apparatus, and computer programs recorded on one or more computer storage devices, each configured to perform the actions of the methods.

Implementations may include one or more of the following features. The non-transitory computer-readable medium where transmitting the audio mix to the user device may include providing an encoded audio mix in a streaming audio format. The first request further includes a prioritization value of at least one sound source of the plurality of sound sources. The prioritization value is based on one or more of a loudness of the at least one sound source and a distance of the at least one sound source from the virtual microphone in the virtual experience. Implementations of the described techniques may include hardware, a method or process, or computer software on a computer-accessible medium.

The system also includes a memory with instructions stored thereon; and Other embodiments of this aspect include corresponding computer systems, apparatus, and computer programs recorded on one or more computer storage devices, each configured to perform the actions of the methods.

Implementations may include one or more of the following features. The system where obtaining the virtual experience state information further includes obtaining a head orientation of a user associated with the user device. Generating the audio mix of the plurality of sounds may include: for each sound source of the plurality of sound sources: generating an audio segment for the sound source based on the corresponding sound source data; and applying, to the audio segment, at least one of: a loudness adjustment based on a distance of the sound source from the virtual microphone in the virtual experience; and a doppler adjustment based on the velocity of the virtual microphone in the virtual experience; and after the applying, combining the audio segments of the plurality of sounds to generate the audio mix. The plurality of sound sources includes at least one diegetic sound source and at least one non-diegetic sound source. Generating the audio mix of the plurality of sounds may include: generating a first set of the plurality of sounds at the server; and transmitting a request to a second server to generate a second set of the plurality of sounds, where the first set and the second set are mutually exclusive. Implementations of the described techniques may include hardware, a method or process, or computer software on a computer-accessible medium.

DETAILED DESCRIPTION

Figure 1:
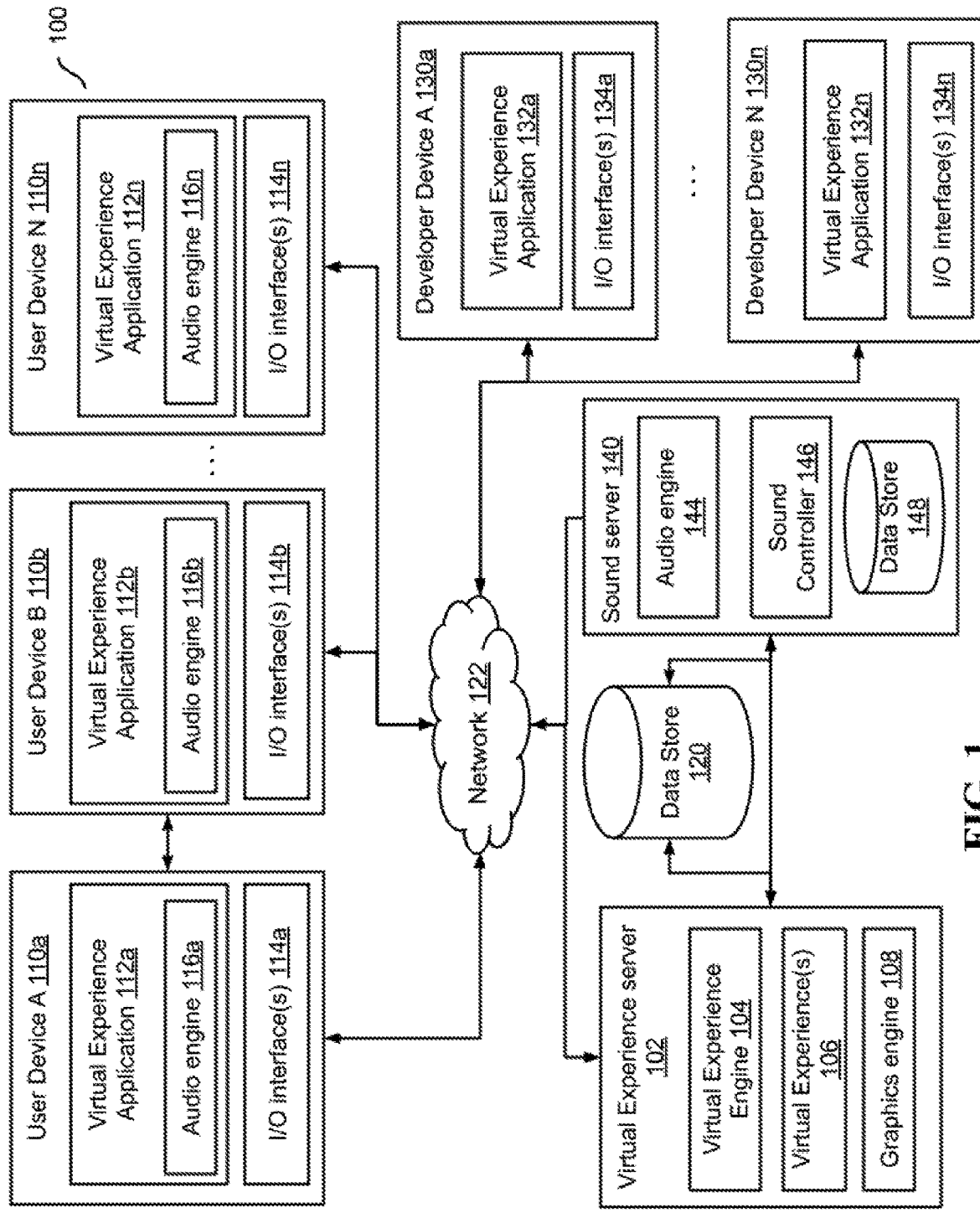
FIG. 1 is a diagram of an example system architecture for distributed processing of sounds in virtual environments, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online virtual experience platforms (also referred to as "user-generated content platforms" or "user-generated content systems") offer a variety of ways for users to interact with one another. For example, users of an online virtual experience platform may work together towards a common goal, share various virtual experience items, send electronic messages to one another, and so forth. Users of an online virtual experience platform may join virtual experience(s), e.g., games or other experiences as virtual characters, playing specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online virtual experience platform may also enable users to experience sounds from the virtual environment. For example, a sound may be generated to simulate footsteps as an avatar moves around within the virtual environment, a sound may be generated to simulate the sound(s) of a waterfall that is part of the virtual environment, sounds may be generated to mimic the sound of people in a stadium. Generated sounds may include sounds from various objects in the virtual environment or other sounds that may not be specifically associated with a particular object, e.g., thunder, etc.

Many online virtual experiences take place in a simulated 3-dimensional reality, a virtual world. The virtual experiences include simulated sounds generated by both the environment and each player. For example: footsteps of avatars (characters), rustle from clothing and accessories worn by the avatars, noise from objects being utilized by the avatar(s), explosions, roars of monsters, crumbling of collapsing buildings, etc.

In some scenarios, if a virtual environment includes a large number of participants (players) and/or objects, the number of sounds that are to be generated may be too large to be produced by a player's (user's) computing device while being able to maintain synchronicity with activity within the virtual environment. This can occur because of relatively low computing capabilities of user devices, which may be performing multiple tasks such as graphics processing, processing of user inputs received from one or more user interfaces, performing physics updates to objects and/or characters in the virtual environment, etc.

In some cases, a number of simulated sounds may be such that it can exceed the computational capacity of a local user device. In such cases, the online virtual experience platform may only be capable of simulating a subset of the sounds to be played, thereby diminishing user experience.

In such scenarios, the virtual experience platform and/or a user device may perform "voice stealing" and only play the highest priority sounds, e.g., by playing only the N loudest sounds. This can negatively affect the user experience by providing a less rich sound experience to users. A technical problem for virtual application platform operators is the simultaneous simulation of multiple sounds within a virtual environment.

The present disclosure addresses the above-described drawbacks by utilizing a cloud-based sound server in conjunction with user devices. Per techniques of this disclosure, the processing and/or simulation of sound(s) is distributed between one or more user device(s) and cloud-based computing devices (e.g., servers, such as physical servers, or virtual machines configured to operate on physical servers). A prioritization value for each sound source to be simulated may be determined, and the processing of each sound may be assigned to a suitable computing device or process based on the prioritization value.

In some implementations, the prioritization value may be determined by a suitable combination of importance to the gameplay, the storyline, loudness of the sound, etc. In some implementations, the prioritization value may be provided by a user, e.g., a developer of a virtual experience.

Techniques of this disclosure enable a user device to receive an audio mix that includes a large number of sounds and provide playback of such a sound mix to provide a more accurate reproduction of sound for a virtual environment. A virtual experience platform can utilize the disclosed techniques to support virtual experiences that have hundreds of thousands of users (e.g., game players, participants in a lecture and/or concert, etc.) all potentially contributing sounds that are heard by a large number of other users (e.g., game players).

FIG. 1 is a diagram of an example system architecture for the distributed processing of sounds in virtual environments, in accordance with some implementations. FIG. 1 and other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online virtual experience server 102, data store 120, user devices 110a, 110b, and 110n (generally referred to as "user device(s) 110" herein), and developer devices 130a and 130n (generally referred to as "developer device(s) 130" herein). virtual experience server 102, sound server 140, data store 120, user devices 110, and developer devices 130 are coupled via network 122. In some implementations, user devices(s) 110 and developer device(s) 130 may refer to the same or same type of device.

Online virtual experience server 102 can include a virtual experience engine 104, one or more virtual experience(s) 106, and graphics engine 108. A user device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc. The input/output devices can also include accessory devices that are connected to the user device by means of a cable (wired) or that are wirelessly connected.

Sound server 140 can include an audio engine 144, and a sound controller 146. In some implementations, the sound server may include a plurality of servers. In some implementations, sound server 150 may be connected to network 122 and to virtual experience server 102. In some implementations, the plurality of servers may be arranged in a hierarchy, e.g., based on respective prioritization values assigned to sound sources. For example, in some implementations, assignment of generation of one or more sound sources to servers in the hierarchy may be based on a prioritization value associated with the sound source.

In some implementations, sound server 140 may be connected to data store 120 and may utilize data store 120 to store data elements associated with the generation of sounds. In some other implementations, sound server 140 may include a separate data store 148.

Audio engine 144 may be utilized for the generation of one of more sounds that are associated with the virtual environment. Sound controller 146 may be utilized for orchestration of computational resources associated with the generation of sounds, e.g., invoking compute instances for sound generation, load balancing of different processes/instances within a distributed computing environment, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, a cloud storage system, or another type of component or device capable of storing data. The data store 120 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, a distributed computing system, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on user devices 110.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be an online gaming server. For example, the virtual experience server may provide single-player or multiplayer games to a community of users that may access or interact with games using user devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using user devices (e.g., 110) within a game (e.g., 106) or the presentation of the interaction on a display or other output device (e.g., 114) of a user device 110.

In some implementations, a game 106 can include an electronic file that can be executed or loaded using software, firmware or hardware configured to present the game content (e.g., digital media item) to an entity. In some implementations, a virtual experience application 112 may be executed and a game 106 executed in connection with a virtual experience engine 104. In some implementations, a game 106 may have a common set of rules or common goal, and the environment of a game 106 shares the common set of rules or common goal. In some implementations, different games may have different rules or goals from one another.

In some implementations, virtual experience(s) may have one or more environments (also referred to as "gaming environments" or "virtual environments" herein) where multiple environments may be linked. An example of an environment may be a three-dimensional (3D) environment. The one or more environments of a virtual experience application 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience server 102 can host one or more virtual experiences 106 and can permit users to interact with the virtual experiences 106 using a virtual experience application 112 of user devices 110. Users of the online virtual experience server 102 may play, create, interact with, or build virtual experiences 106, communicate with other users, and/or create and build objects (e.g., also referred to as "item(s)" or "game objects" or "virtual game item(s)" herein) of virtual experiences 106. For example, in generating user-generated virtual items, users may create characters, decoration for the characters, one or more virtual environments for an interactive game, or build structures used in a game. In some implementations, users may buy, sell, or trade virtual game objects, such as in-platform currency (e.g., virtual currency), with other users of the online virtual experience server 102. In some implementations, online virtual experience server 102 may transmit game content to virtual experience applications (e.g., 112). In some implementations, game content (also referred to as "content" herein) may refer to any data or software instructions (e.g., game objects, game, user information, video, images, commands, media item, etc.) associated with online virtual experience server 102 or virtual experience applications. In some implementations, game objects (e.g., also referred to as "item(s)" or "objects" or "virtual objects" or "virtual game item(s)" herein) may refer to objects that are used, created, shared or otherwise depicted in virtual experience applications 106 of the online virtual experience server 102 or virtual experience applications 112 of the user devices 110. For example, game objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration, rather than limitation. In some implementations, online virtual experience server 102 may host one or more media items that can include communication messages from one user to one or more other users. Media items can include, but are not limited to, digital video, digital movies, digital photos, digital music, audio content, melodies, digital concerts, digital lecture series, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual application 106 may be associated with a particular user or a particular group of users (e.g., a private game), or made widely available to users with access to the online virtual experience server 102 (e.g., a public game). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or user devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the game (e.g., rendering commands, collision commands, physics commands, etc.) In some implementations, virtual experience applications 112 of user devices 110/116, respectively, may work independently, in collaboration with virtual experience engine 104 of online virtual experience server 102, or a combination of both.

In some implementations, both the online virtual experience server 102 and user devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of user device 110. In some implementations, each virtual application 106 may have a different ratio between the virtual experience engine functions that are performed on the online virtual experience server 102 and the virtual experience engine functions that are performed on the user devices 110. For example, the virtual experience engine 104 of the online virtual experience server 102 may be used to generate physics commands in cases where there is a collision between at least two virtual application objects, while the additional virtual experience engine functionality (e.g., generate rendering commands) may be offloaded to the user device 110. In some implementations, the ratio of virtual experience engine functions performed on the online virtual experience server 102 and user device 110 may be changed (e.g., dynamically) based on gameplay conditions. For example, if the number of users participating in gameplay of a particular virtual application 106 exceeds a threshold number, the online virtual experience server 102 may perform one or more virtual experience engine functions that were previously performed by the user devices 110.

For example, users may be playing a virtual application 106 on user devices 110, and may send control instructions (e.g., user inputs, such as right, left, up, down, user election, or character location (position) and velocity information, etc.) to the online virtual experience server 102. Subsequent to receiving control instructions from the user devices 110, the online virtual experience server 102 may send gameplay instructions (e.g., location (position) and velocity information of the characters participating in the group gameplay or commands, such as rendering commands, collision commands, etc.) to the user devices 110 based on control instructions. For instance, the online virtual experience server 102 may perform one or more logical operations (e.g., using virtual experience engine 104) on the control instructions to generate gameplay instruction(s) for the user devices 110. In other instances, online virtual experience server 102 may pass one or more or the control instructions from one user device 110 to other user devices (e.g., from user device 110a to user device 110b) participating in the virtual application 106. The user devices 110 may use the gameplay instructions and render the gameplay for presentation on the displays of user devices 110.

In some implementations, the control instructions may refer to instructions that are indicative of in-game actions of a user's character. For example, control instructions may include user input to control the in-game action, such as right, left, up, down, user selection, gyroscope location (position) and orientation data, force sensor data, etc. The control instructions may include character location (position) and velocity information. In some implementations, the control instructions are sent directly to the online virtual experience server 102. In other implementations, the control instructions may be sent from a user device 110 to another user device (e.g., from user device 110b to user device 110n), where the other user device generates gameplay instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a user device 110 to render gameplay of a game, such as a multiplayer game. The gameplay instructions may include one or more of user input (e.g., control instructions), character location (position) and velocity information, or commands (e.g., physics commands, rendering commands, collision commands, etc.).

In some implementations, the online virtual experience server 102 may store characters created by users in the data store 120. In some implementations, the online virtual experience server 102 maintains a character catalog and game catalog that may be presented to users. In some implementations, the game catalog includes images of virtual experiences stored on the online virtual experience server 102. In addition, a user may select a character (e.g., a character created by the user or other user) from the character catalog to participate in the chosen game. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the user device(s) 110 may each include computing devices such as personal computers (PCs), mobile devices (e.g., laptops, mobile phones, smart phones, tablet computers, or netbook computers), network-connected televisions, gaming consoles, etc. In some implementations, a user device 110 may also be referred to as a "client device." In some implementations, one or more user devices 110 may connect to the online virtual experience server 102 at any given moment. It may be noted that the number of user devices 110 is provided as illustration. In some implementations, any number of user devices 110 may be used.

In some implementations, each user device 110 may include an instance of the virtual experience application 112, respectively. In one implementation, the virtual experience application 112 may permit users to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to user device 110 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

In some implementations, the virtual experience application may include an audio engine 116 that is installed on the user device, and which enables the playback of sounds on the user device. In some implementations, audio engine 116 may act cooperatively with audio engine 144 that is installed on the sound server.

According to aspects of the disclosure, the virtual experience application may be an online virtual experience server application for users to build, create, edit, upload content to the online virtual experience server 102 as well as interact with online virtual experience server 102 (e.g., participate in virtual experiences 106 hosted by online virtual experience server 102). As such, the virtual experience application may be provided to the user device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 122 may permit a developer user(s) to use and interact with online virtual experience server 102, such as control a virtual character in a virtual game hosted by online virtual experience server 102, or view or upload content, such as games 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a virtual experience program) that is installed and executes local to user device 130 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or play games 106 hosted by online virtual experience server 102). As such, the virtual experience application may be provided to the user device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual applications 106 developed, hosted, or provided by a virtual experience application developer.

In some implementations, a user may login to online virtual experience server 102 via the virtual experience application. The user may access a user account by providing user account information (e.g., username and password) where the user account is associated with one or more characters available to participate in one or more games 106 of online virtual experience server 102. In some implementations, with appropriate credentials, a virtual experience application developer may obtain access to virtual experience application objects, such as in-platform currency (e.g., virtual currency), avatars, special powers, accessories, that are owned by or associated with other users.

In general, functions described in one implementation as being performed by the online virtual experience server 102 can also be performed by the user device(s) 110, or a server, in other implementations if appropriate. In addition, the functionality attributed to a particular component can be performed by different or multiple components operating together. The online virtual experience server 102 can also be accessed as a service provided to other systems or devices through appropriate application programming interfaces (APIs), and thus is not limited to use in websites.

In some implementations, online virtual experience server 102 may include a graphics engine 106. In some implementations, the graphics engine 106 may be a system, application, or module that permits the online virtual experience server 102 to provide graphics and animation capability. In some implementations, the graphics engine 106 may perform one or more of the operations described below in connection with the flow charts shown in FIGS. 4 and 5.

Figure 2A:
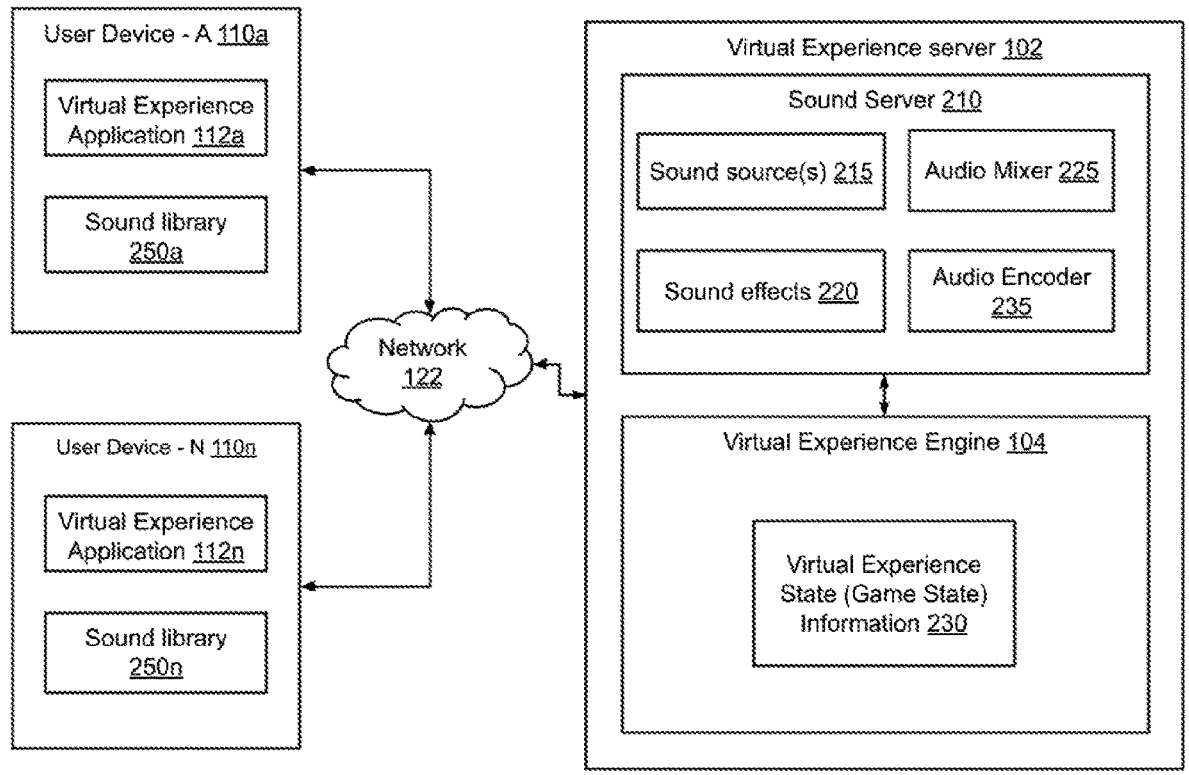
FIG. 2A illustrates an example implementation of a system architecture for the generation of simulated sounds in a virtual environment, in accordance with some implementations.

FIG. 2A illustrates an example system architecture for the simulation of sounds in a virtual environment, in accordance with some implementations.

As depicted in FIG. 2A, one or more user devices 110 are coupled to virtual experience server 102 via network 122. Each user device may include (e.g., have installed) a virtual experience application (e.g., software) that is executed on the user device to enable the user to connect to the virtual experience server and participate in games and/or other activities within a virtual environment. The user device also includes a sound library 250 utilized to simulate sounds within the virtual environment.

In some implementations, the sound library may be a special purpose library configured to generate (produce) sounds. Sounds may be generated by the sound library based on a trigger and/or signal received from a virtual experience application that may make calls to the sound library via an application programming interface (API). The generated sounds may then be played back at the user device, e.g., using speakers of the user device, or an auxiliary device (e.g., headphones, earbuds, etc.) connected to the user device. The timing of the playback of the sounds may be configured by the virtual experience application such that it is synchronized with the virtual environment and with activity of avatar(s) of one or more users and/or virtual objects within the virtual environment.

In some implementations, the sound library may be external to the virtual experience application, whereas in some other implementations, the sound library may be included within the virtual experience application executable.

In some implementations, the sound library may be implemented as a remote procedure call (RPC) shim that is configured such that in addition to generating (creating) sounds, it can also marshal arguments and forward them as calls over a network. The remote procedure call system may be made to a remote processor that is coupled to the user device by a communications channel; the remote processor may be a server accessed over a network, another CPU core in a multicore system on the user device, a computing resource made available from a distributed computing system, etc. The RPC shim is implemented in a manner such that from the perspective of the virtual experience application (the local client), the RPC is similar to calling a function in a library built into the virtual experience application, e.g., a game application, executing on the user device.

FIG. 2A depicts an example sound server 210 for cloud-based processing of sounds in a virtual environment. The sound server may further include modules for the performance of specific processes. For example, the sound server may include sound sources 215, which may include a set of previously generated and/or recorded stored sounds for use within the virtual environment. The sound server also includes modules for processing sound effects 220, e.g., sound effects such as loudness adjustments, Doppler adjustments, reverb effects, echo effects, etc.

In some implementations, sound server 210 may be included within a virtual experience server, as depicted in FIG. 2A. In some other implementations, the sound server may be separate from the virtual experience server.

The sound server may additionally include an audio mixer 225 that can combine audio segments from multiple sources and an audio encoder 235 that can encode final audio mixes for onward transmission, e.g., to a user device.

In some implementations, sound server 210 is provided with virtual application state information 230 that may be provided by a server-based virtual experience engine 104. Virtual application state information may include information associated with objects, avatar(s), and activity within a virtual environment. For example, virtual application state information can include a location (position) of one or more avatars within a virtual environment, a speed or velocity of one or more avatars within a virtual environment, an orientation of an avatar within a virtual environment, etc.

In some implementations, the virtual application is a game application, and the virtual application state information includes game state information, e.g., location and velocity of one or more avatars and/or objects within a game, an orientation of an avatar within a game, etc.

While this illustrative example depicts the sound server to be included within a virtual experience server, in some implementations, the sound server may be implemented separately as well. For example, the sound server may be implemented using a distributed computing system, and RPCs made by a sound library may be transmitted to a sound server implemented using one or more computing resources (processes) at the distributed computing system.

In some implementations, a single sound server process is provided in the cloud per user device (player). Multiple sound server processes may execute on a single physical or virtual server.

In some implementations, multiple sound server processes may be provided in the cloud per user device, while in some other implementations, a single sound process may be provided to serve requests from multiple user devices.

Utilization of a sound server enables offloading at least some of the processing associated with playing audio to a device separate from a local user device and enables processing of sound that may exceed computing or memory limits of the player's devices since a sound server can be provisioned to include additional computing resources. In addition, the hardware of the server can be customized for audio processing with optimized hardware-specific code running on it. Utilization of the sound server can enable a larger number of simultaneously playable sounds when compared to a user device (e.g., a player's computing device).

However, generation of sounds on a remote sound server can incur delays due to time needed to place an RPC call, round trip communication time between a user device and a sound server, and other delays and latencies that can be introduced into the process. This may be unacceptable for some high priority sound sources that may have to be played with a relatively low time delay. For example, a sound corresponding to a splash generated by an avatar jumping into a water body may be best played (rendered) on the local user device upon the avatar entering the water surface for superior user experience. In such a scenario, a time delay incurred in transmitting the request to a sound server, generation of the sound by the sound server, and a transmittal of the final generated sound back to the user device, and the playback of the sound may be too large for suitable user experience.

In some implementations, a prioritization value may be determined for various sound sources based on time sensitivity of the sound playback, which may be utilized to make a determination as to whether a sound should be locally generated or whether it should be generated at a sound server.

For example, in some implementations, a prioritization value may be determined for each sound source that is generated. Based on the prioritization value, one or more of the sounds to be generated may be generated locally at the user device itself. The prioritization value may be based on loudness, the distance of a sound object from an avatar, or other flags set by a user or developer.

In some implementations, the sounds may be prioritized based on a level of criticality (importance) of the particular sound to the artistic impact of the virtual experience or on a level of importance of the particular sound in facilitating the virtual experience, e.g., gameplay. For example, footsteps, clothing, and breathing sounds of an enemy may be prioritized (e.g., be assigned a relatively higher prioritization value) in a first person shooter game because they are important to the gameplay goal of being able to determine where unseen enemies might be located within the virtual environment. Dialogue spoken by a non-player character (NPC) may be prioritized because the dialogue associated with the NPC may be important in a narrative of a game, and/or because it may include important information necessary to complete the game, or because it may set an emotional tone of the game.

In some implementations, the prioritization value can be based on a computational capacity of a local user device to generate one or more sounds. In some cases, a prioritization value may be specified as a time latency threshold for each sound to be received. Based on network conditions, e.g., a round trip transit time to fulfill a request to generate a sound at a server, etc., a total time to receive a sound may be determined and compared to the time latency threshold to determine whether a particular sound should be generated locally or be generated at a remote sound server.

In some implementations, the sound server may be configured as a microservice, whereby requests to the sound server are handled by sound server instances that are provided using a distributed computing environment. When a sound server instance is started (instantiated), registration is performed with a management server (not shown, but may be implemented as part of virtual application server 102 or as a separate server). The management server assigns the sound server instance to a user device (virtual application client), The assignment of the sound server instance to a user device establishes a source device from where a sound server instance can receive RPC calls and a target device where the final audio mix stream is to be transmitted.

In some implementations, the management server performs the assignment of sound servers to user devices (virtual application clients) and provides the virtual application client with the identifiers such as addresses (e.g., IP addresses, MAC addresses, etc.) of all of the sound servers assigned to a particular user device (virtual application client).

In some other implementations, the management server may act as a proxy server and accept sound server calls (RPC) from user devices which may then be forwarded to a separate set of sound servers.

The management server may be in charge of starting remote sound servers on behalf of virtual application clients. The management server may start or stop remote sound servers as needed, while a virtual application is executing. If a virtual application within a virtual environment has a large number of sound sources that generate simultaneous sounds, more servers can be started to meet the requirements. Similarly, if a requirement associated with a virtual application is such that a relatively small number of simultaneous sounds are to be played back, extra remote sound servers may be shut down to save costs. The management server may determine (gauge) the need for sound servers either through signals transmitted from the user device (virtual application client) to the management server, or by directly measuring the number of sounds triggered within the virtual experience, if the management server is configured to perform as a proxy server for multiple remote sound servers.

For interoperability, the microservice can use standard protocols for RPCs and marshaling, and standard protocols such as WebRTC, Real-time Transport Protocol (RTP), or an alternative network standard that may be designed for transmitting audio or video data and is optimized for consistent delivery of live data for the audio streaming.

In some implementations, the sound servers may utilize one or more graphics processing units (GPUs) for processing sounds. In some other implementations, the sound servers may utilize one or more Field Programmable Gate Arrays (FPGAs) or digital signal processing (DSP) cores. In some implementations, the DSPs may be installed on expansion cards to accelerate audio processing in a server.

In some implementations, the sound server may trigger external audio hardware, e.g., a music sampler or synthesizer, and then re-digitize the produced sound for transmission over the network to a user device.

The sound server receives RPCs transmitted from a user device and converts them back into calls into a server based sound library. The server-based sound library creates sounds based on parameters included in the RPC and generates an audio mix. In some implementations, the audio mix is encoded and sent as streaming audio over the network back to the shim library of the user device associated with the transmitted RPC. The streaming audio may be in any suitable format and may include an immersive audio format such as 7.1 surround sound format, 7.4.2 surround sound format, Ambisonics, Vector Base Amplitude Panning (VBAP), Dolby Atmos, etc.

The shim library at the user device receives the audio mix and plays it back at the user device. If the audio mix is in a rotatable immersive format, the user device may perform a rotation on a rendering of the mix to align with the current orientation of a player's avatar, if that differs from the orientation of the player's avatar at the time the audio was rendered. Utilization of a rotatable immersive format for the sound format enables a change in the 3D orientation of the sound field when presenting it to the user to match the orientation at the time of sound playback (e.g., a second orientation), even if the orientation is different from that at the time the sounds are generated (e.g., a first orientation) in response to a request.

Each user device (virtual application client) can receive audio mixes from one or more sound servers. In addition, the user device can generate (create) one or more high priority sounds at the user device itself. High priority sounds may be determined based on the corresponding prioritization values of the sound sources. The sounds generated at the user device can be combined with the sounds generated at one or more sound servers to create the final audio mix.

Figure 2B:
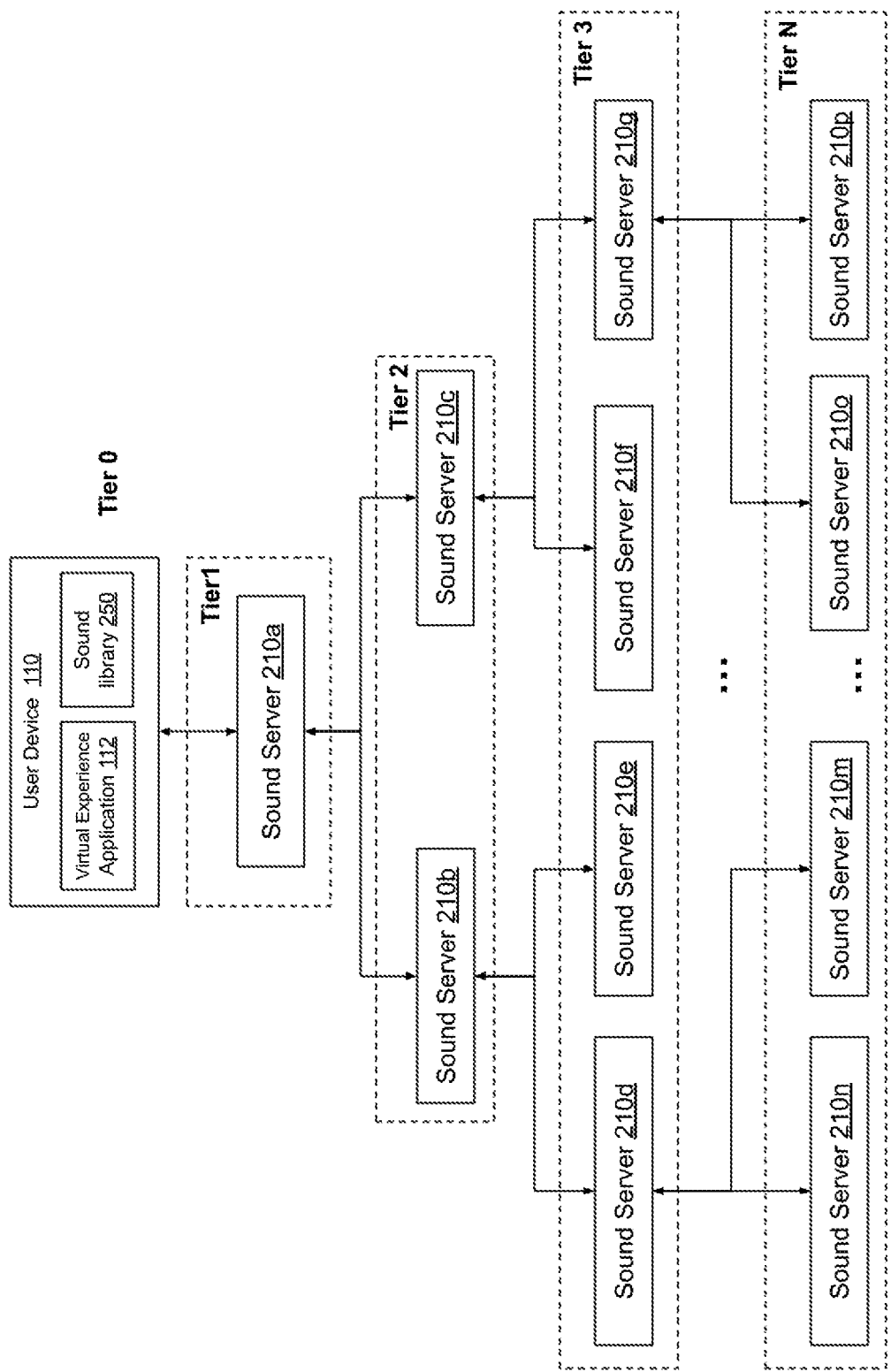
FIG. 2B illustrates an example implementation of a system architecture for the generation of simulated sounds in a virtual environment that includes a hierarchical arrangement of sound servers, in accordance with some implementations.

FIG. 2B illustrates an example implementation of a system architecture for the simulation of sounds in a virtual experience that includes a hierarchical arrangement of sound servers, in accordance with some implementations.

In some implementations, a hierarchical arrangement of sound servers may be provided to enable the generation of a greater number of sounds than what can be generated by a single sound server.

For example, a hierarchical arrangement of sound servers may be provided by arranging remote sound servers in tiers, in a tree structure, where Tier 0 is a user device (virtual application client). The sound server system is configured such that each sound server can be connected to additional sound servers based on a branching factor, L. If each sound server can generate N sounds, any tier N can be connected to up to LAN sound servers that can render up to K*LAN sounds. This configuration enables a relatively large number of sounds, even with a relatively small number of tiers and a small branching factor L. Utilization of additional sound servers that can be invoked (initialized) based on a current requirement of sound servers can provide for a large number of total sounds that can be generated and played back at a user device.

The illustrative example depicted in FIG. 2B includes tiers 0-N, where Tier 0 is the (local) user device 110. Tier 1 includes sound server 210*a*; Tier 2 includes servers 210*b* and 210*c*; Tier 3 includes sound servers 210*a*, 210*e*, 210*f*, 210*g*; and tier N includes 210*n*, 210*m*, 210*o*, and 210*p*. Different tiers may have a different number of servers and the number of tiers may be selected based on various parameters, e.g., a number of sound generating objects in the virtual experience, number of avatars, etc.

Each tier may have a suitable number of servers based on a number of sound sources meeting a prioritization threshold for that tier. In some implementations, the number of servers included in a tier may be based on a sound generation capacity of the servers.

In some implementations, the number of tiers and a branching factor may be based on one or more parameters, e.g., hardware capacity of user device, number of sound sources, network and traffic related parameters, etc.

In some implementations, the number of servers in each tier and the number of total tiers may be dynamically adjusted. In this illustrative example, the branching factor is 2, e.g., each sound server can be connected to up to 2 sound servers at a higher tier.

Prioritization value(s) of sound sources in a plurality of sounds to be generated may be utilized to determine how the sound generation is distributed between the hierarchically arranged sound servers.

In some implementations, different classes of sound servers may be utilized for different classes of sounds. In some implementations, a sound catalog may be distributed across a plurality of sound servers, based on a capacity of block storage available at a sound server. For example, if a catalog of sounds includes about 8 TB of sounds, and each sound server has a capacity of 2 TB as block storage, the 8 TB of sounds may be distributed among 4 servers. Based on an incoming request for generation of sounds, a suitable sound server(s) may be utilized and the sound playback may be routed to the sound server(s) that includes the data for the desired sound(s).

In some implementations, the branching factor (L) may be determined based on the Input/Output (I/O) capabilities of the network. For example, if a server can only have 100 network connections, one network connection is allocated for the outward transmission of a generated audio mix, and up to 99 additional sound servers may be configured as branched servers from which it may receive audio.

Figure 3:
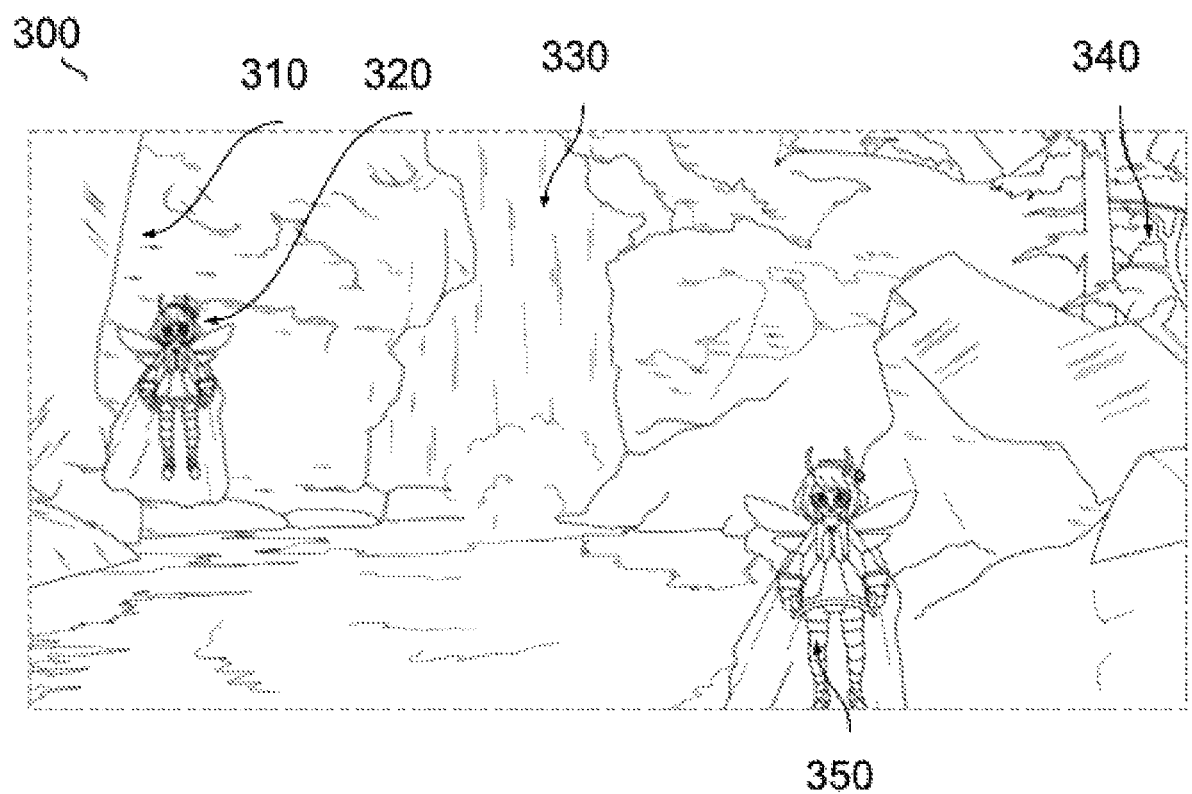
FIG. 3 is a diagram illustrating an example scene within a virtual environment in which simulated sounds are utilized, in accordance with some implementations.

FIG. 3 is a diagram illustrating an example scene within a virtual experience (environment) that utilizes sounds, in accordance with some implementations. The example scene may be one that is displayed on a display of a user device utilized by a player playing a game on an online virtual experience platform.

In this illustrative example, two characters (avatars) are depicted; a first avatar 320 and a second avatar 350. The virtual experience includes a cave 310, a waterfall 330, and a forest experience 340.

One or more objects and/or avatars within a virtual experience can be associated with sound objects. The sound objects may be associated with avatars and/or objects in the experience by a developer user, e.g., a developer utilizing a developer device 130 described with respect to FIG. 1.

In this illustrative example, the waterfall may be associated with sounds of a waterfall, and the forest may be associated with sounds of the forest, e.g., sound that includes crickets, other insects, etc.

A developer user may also specify sound effects and setting, e.g., absolute loudness, a roll-off distance that specifies a distance from the sound object at which the sound starts fading, a function that specifies how the loudness varies as a function of distance from the object (e.g., linear drop off, logarithmic drop off, etc.), reverb effects that provide echoes that are packed together such that they form an indistinguishable blend of delayed sounds, an echo effect based on a distance of the object within an enclosure, etc.

In some implementations, the sound server(s) may be utilized for both diegetic sounds (sound sources in the virtual world) as well as for nondiegetic sounds. A nondiegetic sound is a sound within a virtual experience (e.g., a game) but one that is not part of the virtual experience (world), in that it does not correspond to any virtual physical source in the world. Examples from games and film are narration and music tracks. Non diegetic sounds would typically not pan with the viewpoint of the character (who is in the world) and/or avatar, and hence may be processed differently from other sounds. Sound sources in the real world may also be included and associated with avatars within the virtual experience. For example, the speech of users associated with avatars 310 and 350 are nondiegetic sounds and may also be included as sound objects within the virtual experience.

In some implementations, the sounds may include voice chat, NPC dialogue, narration, background music, ambiences, spot sound effects, character foley, etc.

Figure 4:
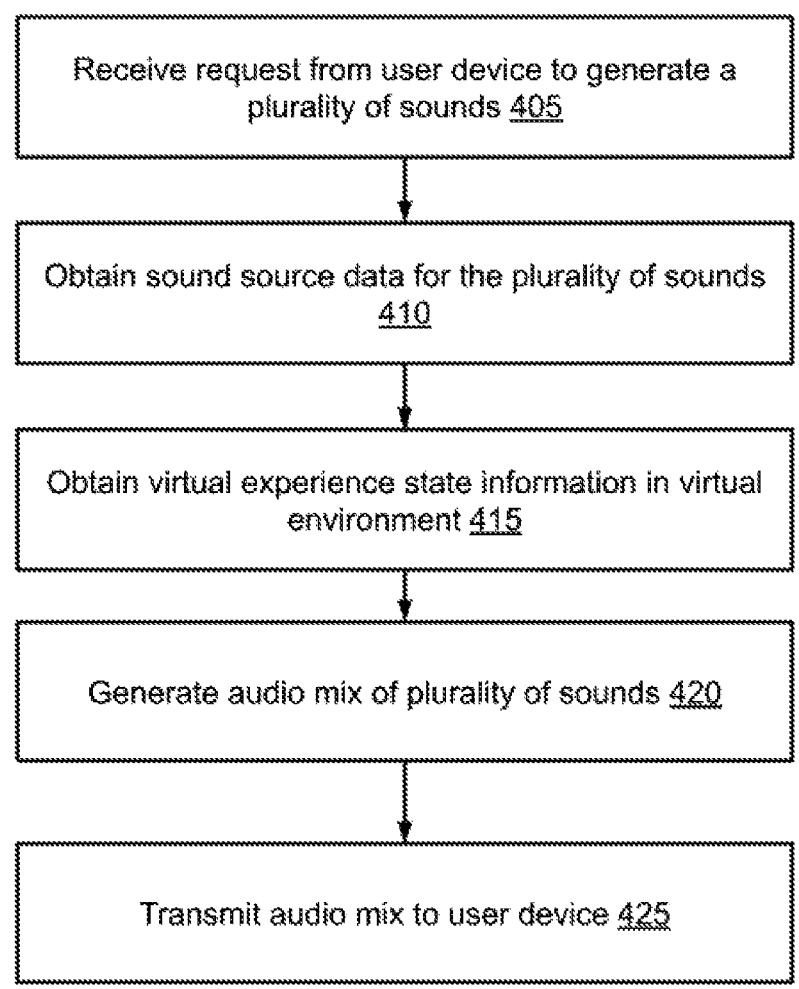
FIG. 4 is a flowchart illustrating an example method to provide an encoded sound mix to a user device, in accordance with some implementations.

FIG. 4 is a flowchart illustrating an example method to provide an encoded sound mix to a user device, in accordance with some implementations.

In some implementations, method 400 can be implemented, for example, on virtual experience server 102 described with reference to FIG. 1. In some other implementations, method 400 can be implemented, for example, on one or more sound servers described with reference to FIG. 2. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

Method 400 may begin at block 405.

At block 405, a request is received at a sound server to generate a plurality of sounds for a user device. The user device may be associated with an avatar that participates in a virtual experience.

In some implementations, the frequency of received requests to play a sound may be based on the particular virtual experience. For example, if the requests are associated with a game, the frequency may be based on the particular game and/or sound design. For example, the sound requests may be batched once every 60th of a second as the game loop iterates, and there may be an arbitrary number of sounds included with each request and/or iteration.

Block 405 may be followed by block 410.

At block 410, sound source data is obtained for a plurality of sound sources associated with each of the plurality of sounds. In some implementations, the sound source data is obtained from a set of sound objects associated with a virtual experience that are stored. The sound source data may be an audio (sound) file that is uploaded by a user or a sound object provided by the online virtual experience platform. For example, the sound objects may include sounds such as the sound of footsteps, sounds of waterfalls, sounds of weapons, sounds objects colliding, etc. Block 410 may be followed by block 415.

At block 415, virtual experience state information is obtained by the remote sound server.

In some implementations, the virtual experience state information may include a location of a virtual microphone in the virtual experience and at least one of a velocity of the virtual microphone in the virtual experience or an orientation of the virtual microphone in the virtual experience.

In some implementations, e.g., the velocity of the virtual microphone may be an absolute velocity of the virtual microphone within a virtual experience. In some implementations, the velocity of the virtual microphone may be a relative velocity of the virtual microphone relative to one or more sound sources.

In some implementations, a location of the virtual microphone may be based on a location (position) of a virtual camera placed within the virtual experience. In some implementations, a location of the virtual microphone may match the location (position), e.g., be co-located with, of a virtual camera placed within the virtual experience. In some other implementations, a location of the virtual camera and/or virtual microphone may be based on a location (position) of an avatar that is a participant within the virtual experience. For example, in some implementations, the virtual camera and/or virtual microphone may be located at a location relative to the shoulder location (position) of an avatar associated with the user device.

In some implementations, the location of a virtual microphone may be such that it is equidistant from the location (position) of a virtual camera and the location (position) of the avatar associated with the user device. In some implementations, the location of the virtual microphone is based on a distance specified by a developer associated with the virtual experience that specifies a location (position) of the virtual microphone relative to the virtual camera and to the avatar.

In some implementations, the virtual experience may be an online game, and the virtual experience state information may include game state information. For example, the game state information can include one or more parameters, e.g., a location of an avatar in the virtual experience, a velocity or speed of the avatar in the virtual experience, and an orientation of the avatar in the virtual experience. In some implementations, the game state information can include two or more of a location of the avatar in the virtual experience, a velocity (or speed) of the avatar in the virtual experience, and an orientation of the avatar in the virtual experience.

Block 415 may be followed by block 420.

Figure 5:
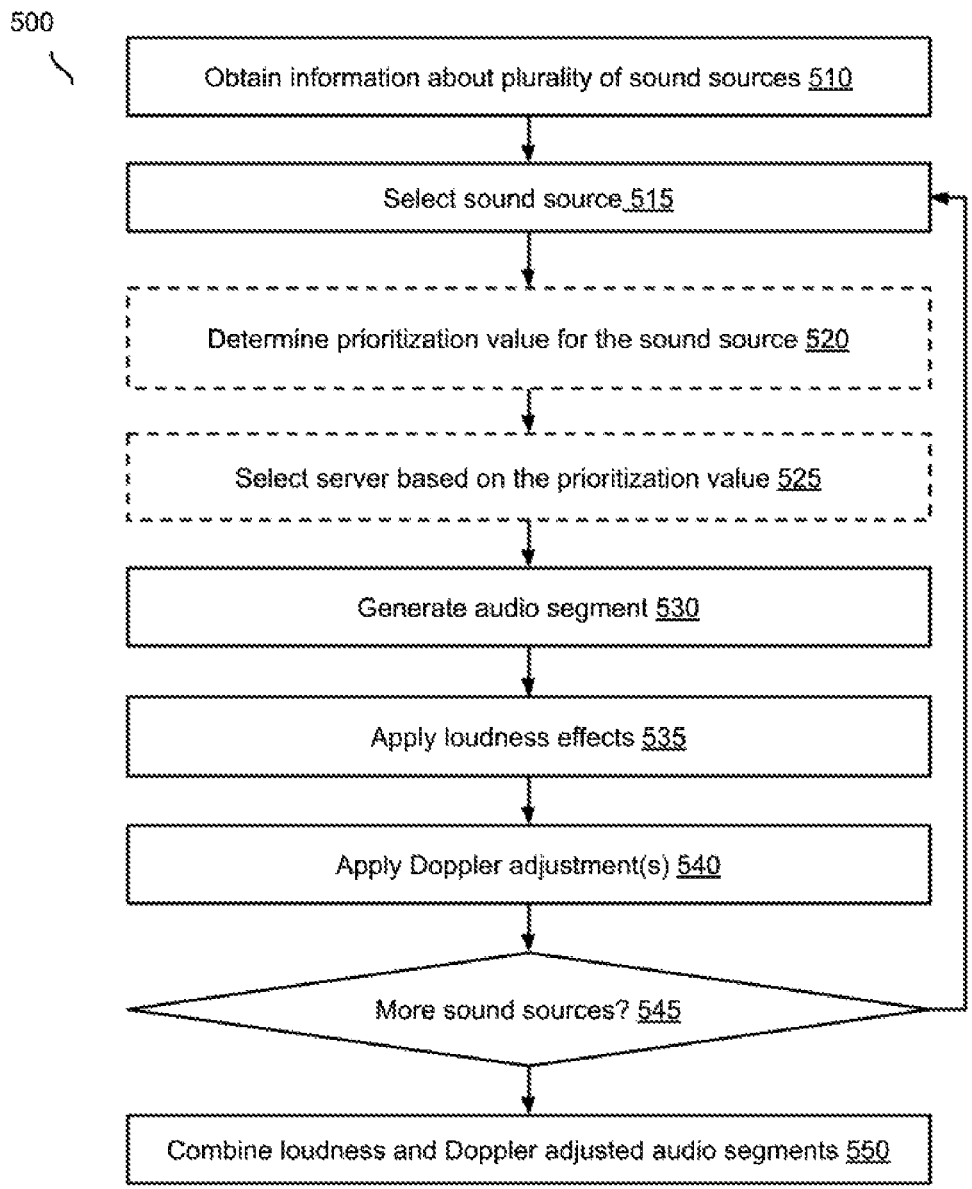
FIG. 5 is a flowchart illustrating an example method to generate an audio mix of a plurality of sounds, in accordance with some implementations.

At block 420, an audio mix of the plurality of sounds based on the first request is generated by the remote sound server based on the sound source data for the plurality of sounds and the virtual experience state information. FIG. 5 illustrates an example method to generate an audio mix of the plurality of sounds. Block 420 may be followed by block 425.

At block 425, the audio mix is transmitted to the user device. For example, the audio mix may be encoded in a streaming audio format prior and then transmitted to the user device. Providing the audio mix in a streaming format enables quick or instant playback of the audio by the user device, since the playback can begin based on received data. Synchronization of encoded sound packets may be based on time-stamped audio, video, and other events.

For transmitting sounds over the network to the user device, the audio mix may be encoded such that the codec packets include about 20 ms of sound, but the encoding and codec sizes may be configurable based on the particular virtual experience.

In some implementations, the packet size may be selected to be as small as possible to reduce latency until limits of efficiency are reached. For example, if too little audio is sent in each packet, then most of the packet data will be network packet headers leading to wasted bandwidth.

If a sound is not received, error correction or concealment may be utilized at the user device to account for missing sounds. For example, a model of the sounds playing may be utilized to synthesize replacement audio to replace missing packets from a sound server.

FIG. 5 is a flowchart illustrating an example method to generate an audio mix of a plurality of sounds, in accordance with some implementations.

Method 500 may begin at block 510 and may be performed for each sound source included in a plurality of sound sources for which corresponding sounds are to be generated.

At block 510, information associated with a sound source may be obtained for each sound source of the plurality of sound sources. The sound source may be an audio file in a suitable format such as WAV, PCM, AIFF, MP3, AAC, OGG, FLAC, ALAC, etc. Based on the sound source, an audio (sound) segment may be generated for a time duration corresponding to the request.

In some implementations, the sound source file is obtained from a data store that can be accessed by the remote sound server. In some implementations, sound source(s) associated with a particular virtual experience or game may be pre-fetched and stored on a storage device associated with the sound server, e.g., an on-processor high bandwidth memory associated with a processor of the source server.

Block 510 may be followed by block 515.

At block 515, a particular sound source is selected. Block 515 may be followed by block 520.

At block 520, a prioritization value may be determined for the particular sound source.

Block 520 may be followed by block 525.

At block 525, a server may be selected or assigned based on the prioritization value of the sound source.

Rendering sounds on a distant server has the drawback that there can be hundreds of milliseconds of delay between when a sound is triggered on the player's devices, when it is rendered on the server, and when it is finally received and played back on the player's device.

To mitigate this, the shim library can be expanded to also be a sound library. When a request for a sound is triggered, a prioritization value of the sound source is used to decide whether or not to play the sound using the local sound library, or whether to render on the sound server. The prioritization value can either be sent from the virtual experience, e.g., a game or computed from the parameters of the sound (e.g., loudness, distance). In this case high priority sounds play nearly instantly, while lower priority sounds play with some delay.

In some implementations, the plurality of sounds included in a first request may exclude sounds that are to be generated at the user device. Generating sounds at the user device may mitigate delays that may be incurred in transmitting a request from a user device to a sound server, generation of the sounds at the sound server, and transmitted generated sounds back to the user device for subsequent playback. A prioritization value may be determined for each sound source which is utilized to determine whether one or more sounds should be generated at the user device or at a remote sound server.

In some implementations, the prioritization value for each sound source is determined based on one or more parameters associated with the sound object and/or with an avatar associated with the user device. For example, the prioritization value of a sound source may be based on the loudness of a sound, the distance of an avatar from a sound source, distance of a virtual microphone from a sound source, etc.

In some implementations, the prioritization value for a sound source is based on one or more of a loudness of each sound source associated with the sound and a distance of each sound source from a virtual microphone in the virtual experience.

In some implementations, a ranked list may be generated of a total number of sounds to be generated, and a threshold number of high priority sounds may be generated locally at the user device, and a remainder may be included in the first request transmitted to a remote sound server. For example, each of the plurality of sounds included in the first request may be associated with a prioritization value that meets a threshold that is determined.

In some implementations, the threshold may be a predetermined fixed threshold. In some other implementations, the threshold is based on network speed(s) (bandwidth of a network connection, measured network speeds, etc.), roundtrip latency of packets between the user device and one or more remote sound server(s), local user device capacity, etc.

In some implementations, the prioritization value is determined at the local device and transmitted to a remote sound server. For example, a first request may include a prioritization value for each of the plurality of sound sources included in the request.

In some other implementations, the prioritization value is determined at a remote sound server based on parameters associated with each of the sound sources. The parameters associated with each of the sounds may be received from the user device, from a virtual experience server, or from another data store associated with an online virtual experience platform.

In some implementations, a ranking of each of the sounds may be performed, and a certain portion (e.g., percentage or number of sounds) may be performed at the local user device and the remainder of the sounds may be included in a request transmitted to a remote sound server for generation at the remote sound server.

Block 525 may be followed by block 530.

At block 530, an audio segment may be generated. Block 530 may be followed by block 535.

At block 535, a loudness adjustment may be applied to the audio segment based on a distance of the sound source from the virtual microphone and/or avatar in the virtual experience to generate a loudness adjusted audio segment.

Block 535 may be followed by block 540.

At block 540, a Doppler adjustment is applied to the loudness adjusted audio segment based on the velocity of the virtual microphone and/or avatar in the virtual experience to generate a loudness and Doppler adjusted audio segment. In some implementations, the velocity of the virtual microphone and/or avatar may be a relative velocity when compared to one or more sound sources within the virtual experience.

Block 540 may be followed by block 545.

At block 545, it is determined whether there are additional sound sources to be processed. If it is determined that there are additional sound sources to be processed, block 545 may be followed by block 515, else block 545 may be followed by block 550.

At block 550, the loudness and Doppler adjusted audio segments of each of the plurality of sounds are mixed to generate the audio mix of the plurality of sounds.

In some implementations, the transmission of the audio mix is a transmission of an encoded audio mix in a streaming audio format to the user device. For example, an audio mix can be encoded using an audio codec such as VBAP, Dolby, Ambisonics, etc.

In some implementations, a single sound server or sound server process may be utilized to process sounds for a single user device. In some implementations, a single sound server may be utilized for multiple user devices.

In some implementations, a single sound server or sound server process may be utilized to process requests from user devices associated with avatars that inhabit the same virtual experience. In a situation where avatars inhabit the same virtual experience, the respective players hear the same sound sources, but differently based on distance a distance of the avatar from the source, a location of the avatar from the sound source, and Doppler effects for each avatar based on a relative motion of the avatar and the sound source within the virtual experience.

In some implementations, computing power can be saved by generating an initial audio for each sound source identically for each user device (associated with the avatar). Separate loudness effects and Doppler processes can be applied to the generated initial audio to generate two respective audio mixes, which may then be encoded and streamed to two different user devices (virtual application clients).

The saving of compute resources by utilizing a single sound server to generate sounds for user devices whose avatars inhibit the same virtual experience can be realized even in situations where the virtual application client needs more sounds than what can be generated by a single sound server. For example, in an illustrative example, a single sound server can generate 6 sounds. In this illustrative example, in a scenario where two user devices have avatars that inhabit the same virtual experience and need to generate a total of 8 sounds. Sharing two sound servers each of which are assigned to generate 4 sounds each may provide computational savings over an assignment of a separate sound server to each user device, each of which simultaneously produces a final audio mix for each client. This approach of utilizing a single sound server to generate sounds for user devices whose avatars inhabit the same virtual experience may lead to utilization of fewer servers than if the virtual application clients did not share servers.

For example, in some implementations, where a single sound server is utilized to generate all sounds in a single virtual experience, a second request may be received to generate a second plurality of sounds from a second user device that is participating in the same virtual experience as the user device. Generating an audio segment for the second user device may be based on generating an unadjusted audio (sound) segment associated with a sound source and then applying respective adjustments for each user device based on respective virtual application state information, e.g., game state information associated with an avatar associated with each user device.

For example, a first loudness adjustment may be applied to the audio segment based on a distance of the sound source from the avatar in the virtual experience associated with the user device to generate a first loudness adjusted audio segment and a second loudness adjustment may be applied to the audio segment based on a distance of the sound source from the avatar in the virtual experience associated with the second user device to generate a second loudness adjusted audio segment.

Subsequent to the generation of the loudness adjusted audio segments, Doppler adjustments may be applied. For example, a first Doppler adjustment may be applied to the first loudness adjusted audio segment based on relative velocities (or speeds) of a first avatar (associated with the first user device) and the sound source to generate a first loudness and Doppler adjusted audio segment. A second Doppler adjustment may be applied to the second loudness adjusted audio segment based on relative velocities (or speeds) of a second avatar (associated with the second user device) and the sound source to generate a second loudness and Doppler adjusted audio segment.

A plurality of first loudness and Doppler adjusted audio segments, each associated with a respective sound source of the plurality of sounds is mixed to generate a first audio mix of the plurality of sounds and a plurality of second loudness and Doppler adjusted audio segments, each associated with a respective sound source of the plurality of sounds is mixed to generate a second audio mix of the plurality of sounds. The first audio mix and the second audio mix may be encoded and transmitted (streamed) to respective user devices (virtual application clients).

In some implementations, the plurality of sounds can include at least one diegetic sound source and at least one non-diegetic sound source.

Virtual experiences commonly incorporate voice chat among participants. The participant's (e.g., a game player's) voice is recorded by a microphone on a user device of the participant and can be played back either as a diegetic sound (a sound source that is associated with the virtual world) or as a non-diegetic sound (a sound that originates from and/or exists outside of the virtual world).

The remote sound server can be utilized to perform the decoding and mixing of the voice chat streams from other participants. This provides the benefit of offloading the processing from a user device of the participant to a remote sound server, and enables the remote sound server to provide the same benefits for voice streams from participants as it does for other virtual application sounds, e.g., superior sound fidelity, sound effects, etc.

In order to do this, the sound servers are configured to receive audio streams as well as transmit (send) the audio streams. For diegetic sounds, metadata associated with the voice chat streams, e.g., metadata describing the sound's location and, optionally, velocity in the virtual world. After receiving and decoding the streams, the sound server may then mix them as it mixes all other virtual application sounds.

In some implementations, the same codec may be utilized for the generation of voice-based sounds and for other sounds. In some other implementations, separate specialized voice-optimized codecs may be utilized for processing voice-based sounds. The sound servers may be configured such that multiple codecs may be utilized simultaneously for different sounds.

In some implementations, a user device may have an upper limit of a number of remote sound servers that it can connect to. Each connection to a remote sound server has a network bandwidth cost from an audio stream, and a compute cost associated with decoding and mixing that stream. Consequently, user devices (clients) can reach (hit) a limit on a number of sound servers that can be utilized to perform the generation of a set of sounds. For example, in a particular scenario, 5 remote sound servers may be needed in order to generate a requested number of sounds based on sound server capacity, but the user device itself may only be able to connect to 1 or 2 remote sound servers based on particular limitations.

In some implementations, hierarchical mixing may be utilized to mitigate limits on a number of remote sound servers that can directly connect to a user device.

Hierarchical mixing may be implemented by arranging remote sound servers in tiers, in a tree structure, where tier 0 is the user device (virtual application client). The sound server system is configured such that a sound server in a given tier, N can mix up to K sounds and up to L streams (a branching factor) received from a higher tier, N+1. Thus, any tier N can be connected to up to LAN servers that can render up to K*LAN sounds. This configuration enables a relatively large number of sounds, even with a small number of tiers and a small branching factor L. Utilization of additional sound servers that can be invoked (initialized) based on a current requirement of sound servers can provide for a very large number of total sounds that can be generated and played back at a user device.

Prioritization value(s) of sound sources for a plurality of sounds to be generated are utilized to determine how the sounds are distributed between the hierarchically arranged sound servers. In some implementations, a latency of a hop from a first remote sound server to a second remote sound server is measured and utilized to further tune hierarchical mixing. For example, a time to generate a first set of sounds may be smaller than a time to generate a second set of sounds that is larger than the first set. However, if the increased latency incurred in communicating a request to a second server to generate a portion of the sounds and receiving a set of generated sounds may outweigh the processing time cost of generating the second set of sounds at the first server itself.

In some implementations, dynamic adjustments may be made to the generation of sounds at hierarchically organized servers based on virtual experience state information and/or network conditions.

In some implementations where hierarchical mixing is performed, generating an audio mix of a plurality of sounds may include generating a first portion (set) of the plurality of sounds at a first remote sound server. The remainder of the portions may be generated at a second server. A request may be transmitted to a second server to generate a second set (a remainder) of the plurality of sounds. In some implementations, the hierarchical mixing of the plurality of sounds excludes sounds that are to be generated at the user device itself.

The request may be received at the second server, which is utilized to generate the second set of the plurality of sounds. In some implementations, the generated second set of the plurality of sounds is transmitted directly to the user device, whereas in some other implementations, the generated second set of the plurality of sounds may be transmitted back to the first server, where it may be combined (mixed) with the first set of the plurality of sounds that was generated at the server.

Depending on the number of sounds in the plurality of sounds, in some implementations, a third set of the plurality of sounds may be generated at a third server. The third set may include sounds that were not included in the portion of the second set of sounds.

A request may be transmitted to a third server to generate a third set of the plurality of sounds. The request may be received at the third server, which may then generate the third set of sounds of the plurality of sounds. The third set of sounds may be transmitted back to the second server for combining with the second set of sounds, and onwardly transmitted to the second server either in the generated form as the third set of sounds or combined with the second set of sounds (which was generated at the second server) and then transmitted.

The generated sounds are received by the user device and played back using an output interface at the user device. In some implementations, time stamps are utilized to play back the sounds at the user device. In some implementations, some of the sounds may be played back in an unsynchronized manner. A prioritization value of the sounds may be utilized to determine which of the sounds may be played back in an unsynchronized manner. For example, a sound associated with an specific object that is important to the virtual experience, e.g., a gunshot associated with the firing of a weapon, may have a relatively high prioritization value and may be played synchronously to actions within the virtual experience, whereas a sound of background crowd noise in a stadium may be assigned a relatively low prioritization value and may be played back asynchronously at a user device.

In some implementations, the virtual experience state information (e.g., game state information) can also include a head orientation of a user associated with the user device. The head orientation of the user may be utilized to adjust playback of the sound at the user device.

Figure 6:
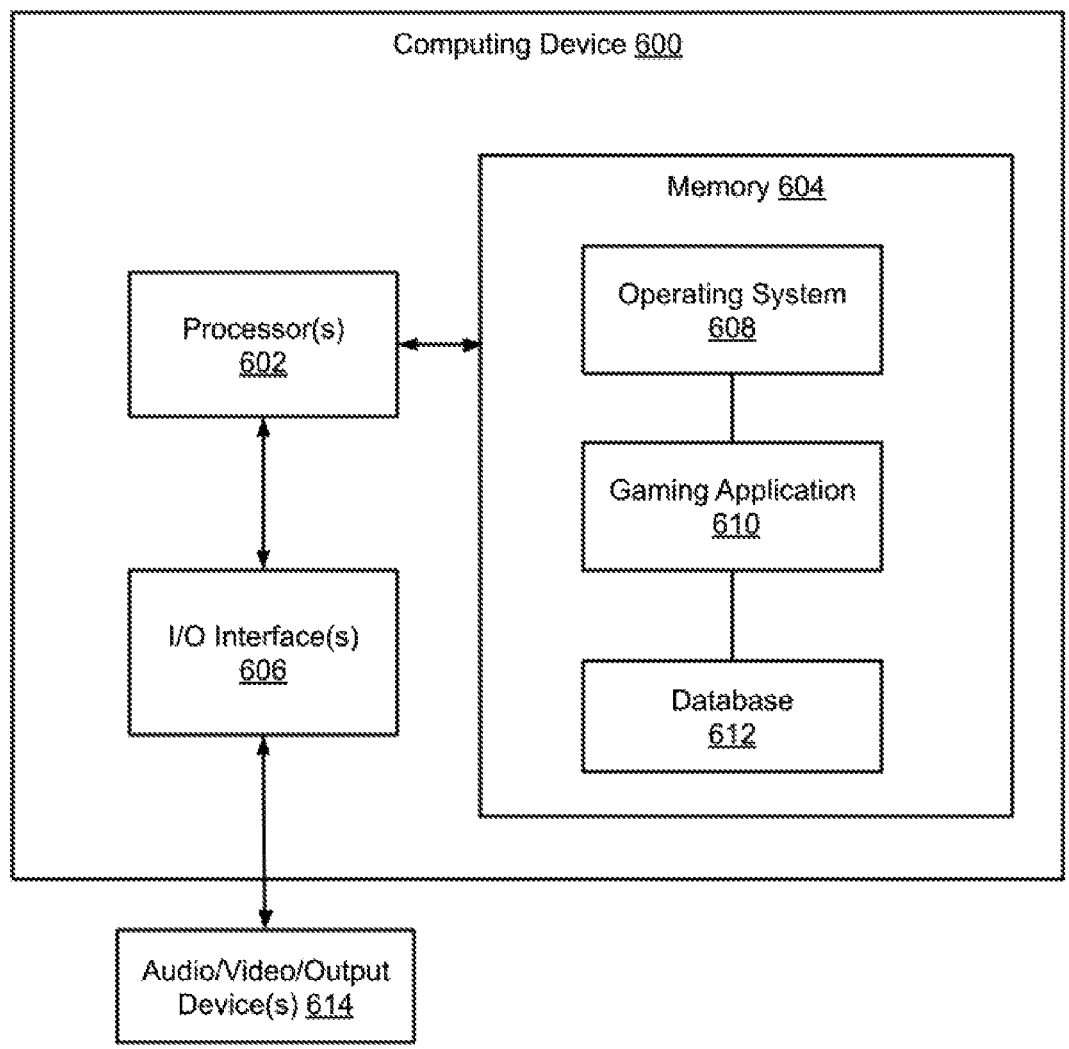
FIG. 6 is a block diagram illustrating an example computing device, in accordance with some implementations.

FIG. 6 is a block diagram of an example computing device 600 which may be used to implement one or more features described herein. In one example, device 600 may be used to implement a computer device (e.g., 102 and/or 110 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., an audio spatialization application, and application data 612. In some implementations, application 610 can include instructions that enable processor 602 to perform the functions (or control the functions of) described herein, e.g., some or all of the methods described with respect to FIGS. 4 and 5.

For example, applications 610 can include an audio spatialization module which as described herein can provide audio spatialization within an online virtual experience server (e.g., 102). Any software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 614 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software engines. In other implementations, device 600 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the user device can be provided in memory and used by the processor. The I/O interface for a user device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   receiving, at a server, a first request to generate a plurality of sounds for a user device, wherein the user device is associated with a virtual experience hosted by the server;
   obtaining, by the server, sound source data for a plurality of sound sources in the virtual experience, each sound source associated with a particular sound of the plurality of sounds;
   obtaining, by the server, virtual experience state information that comprises a location of a virtual microphone in the virtual experience and at least one of: a velocity of the virtual microphone in the virtual experience or an orientation of the virtual microphone in the virtual experience;
   generating, by the server, an audio mix of the plurality of sounds based on the sound source data and the virtual experience state information; and
   transmitting the audio mix to the user device.

2. The computer-implemented method of claim 1, wherein transmitting the audio mix to the user device comprises providing an encoded audio mix in a streaming audio format.

3. The computer-implemented method of claim 1, wherein the first request further includes a prioritization value of at least one sound source of the plurality of sound sources.

4. The computer-implemented method of claim 3, wherein the prioritization value is based on one or more of a loudness of the at least one sound source and a distance of the at least one sound source from the virtual microphone in the virtual experience.

5. The computer-implemented method of claim 1, wherein obtaining the virtual experience state information further includes obtaining a head orientation of a user associated with the user device.

6. The computer-implemented method of claim 1, wherein generating the audio mix of the plurality of sounds comprises:
   for each sound source of the plurality of sound sources:
      generating an audio segment for the sound source based on the corresponding sound source data; and applying, to the audio segment, at least one of:
- a loudness adjustment based on a distance of the sound source from the virtual microphone in the virtual experience, or
- a Doppler adjustment based on the velocity of the virtual microphone in the virtual experience; and after the applying, combining the audio segments of the plurality of sounds to generate the audio mix.

7. The computer-implemented method of claim 6, further comprising receiving a second request to generate a second plurality of sounds associated with a second virtual microphone that participates in the virtual experience, and wherein generating the audio mix of the plurality of sounds comprises:

for each sound source:
applying, to the generated audio segment, at least one of:
- a second loudness adjustment based on a distance of the sound source from the second virtual microphone in the virtual experience; and
- a second Doppler adjustment based on the velocity of the second virtual microphone in the virtual experience; and after the applying of the at least one of the second loudness adjustment and the second Doppler adjustment, combining the audio segments of the plurality of sounds to generate a second audio mix.

8. The computer-implemented method of claim 1, wherein the plurality of sound sources includes at least one diegetic sound source and at least one non-diegetic sound source.

9. The computer-implemented method of claim 1, wherein generating the audio mix of the plurality of sounds comprises:
generating a first set of the plurality of sounds at the server; and
transmitting a request to a second server to generate a second set of the plurality of sounds, wherein the first set and the second set are mutually exclusive.

10. The computer-implemented method of claim 9, wherein generating the first set of sounds comprises generating one or more sounds of sound sources that are associated with a prioritization value that meet a predetermined prioritization value threshold.

11. The computer-implemented method of claim 9, further comprising:
receiving the request at the second server to generate the second set of the plurality of sounds;
generating a portion of the second set of the plurality of sounds at the second server; and
transmitting a request to a third server to generate a third set of the plurality of sounds.

12. The computer-implemented method of claim 1, wherein obtaining the location of the virtual microphone comprises:
obtaining a location of a virtual camera placed within the virtual experience; and
determining the location of the virtual camera based on the location of the virtual camera.

13. The computer-implemented method of claim 1, wherein the location of the virtual microphone comprises:
obtaining a location of an avatar within the virtual experience; and
determining the location of the virtual microphone based on the location of the avatar.

14. The computer-implemented method of claim 1, wherein obtaining the location of the virtual microphone comprises:
obtaining a location of a virtual camera placed within the virtual experience;
obtaining a location of an avatar within the virtual experience; and
determining the location of the virtual microphone based on the location of the virtual camera.

15. The computer-implemented method of claim 14, wherein the location of the virtual microphone is determined such that the virtual microphone is equidistant from the location of a virtual camera and the location of the avatar.

16. A non-transitory computer-readable medium comprising instructions that, responsive to execution by a processing device, causes the processing device to perform operations comprising:
receiving, at a server, a first request to generate a plurality of sounds for a user device, wherein the user device is associated with an avatar that participates in a virtual experience hosted by the server;
obtaining, by the server, sound source data for a plurality of sound sources associated with the plurality of sounds;
obtaining, by the server, virtual experience state information that comprises a location of a virtual microphone in the virtual experience and at least one of: a velocity of the virtual microphone in the virtual experience or an orientation of the virtual microphone in the virtual experience;
generating, by the server, an audio mix of the plurality of sounds based on the sound source data and the virtual experience state information; and
transmitting the audio mix to the user device.

17. The non-transitory computer-readable medium of claim 16, wherein transmitting the audio mix to the user device comprises providing an encoded audio mix in a streaming audio format.

18. The non-transitory computer-readable medium of claim 16, wherein the first request further includes a prioritization value of at least one sound source of the plurality of sound sources.

19. The non-transitory computer-readable medium of claim 18, wherein the prioritization value is based on one or more of a loudness of the at least one sound source and a distance of the at least one sound source from the virtual microphone in the virtual experience.

20. A system comprising:
a memory with instructions stored thereon; and
a processing device, coupled to the memory, the processing device configured to access the memory and execute the instructions, wherein the instructions cause the processing device to perform operations including:
receiving, at a server, a first request to generate a plurality of sounds for a user device, wherein the user device is associated with a virtual experience hosted by the server;
obtaining, by the server, sound source data for a plurality of sound sources associated with the plurality of sounds;
obtaining, by the server, virtual experience state information that comprises a location of a virtual microphone in the virtual experience and at least one of: a velocity of the virtual microphone in the virtual experience or an orientation of the virtual microphone in the virtual experience;

generating, by the server, an audio mix of the plurality of sounds based on the sound source data and the virtual experience state information; and transmitting the audio mix to the user device.

21. The system of claim 20, wherein obtaining the virtual experience state information further includes obtaining a head orientation of a user associated with the user device.

22. The system of claim 20, wherein generating the audio mix of the plurality of sounds comprises:

for each sound source of the plurality of sound sources:
   generating an audio segment for the sound source based on the corresponding sound source data; and
   applying, to the audio segment, at least one of:
      a loudness adjustment based on a distance of the sound source from the virtual microphone in the virtual experience; and
      a Doppler adjustment based on the velocity of the virtual microphone in the virtual experience; and
   after the applying, combining the audio segments of the plurality of sounds to generate the audio mix.

23. The system of claim 20, wherein the plurality of sound sources includes at least one diegetic sound source and at least one non-diegetic sound source.

24. The system of claim 20, wherein generating the audio mix of the plurality of sounds comprises:

generating a first set of the plurality of sounds at the server; and transmitting a request to a second server to generate a second set of the plurality of sounds, wherein the first set and the second set are mutually exclusive.

* * * * *